United States Patent [19]

Balaban et al.

[11] 4,266,245
[45] May 5, 1981

[54] DIFFERENTIAL AMPLIFIER CURRENT REPEATER

[75] Inventors: Alvin R. Balaban, Lebanon; Steven A. Steckler, Clark, both of N.J.

[73] Assignee: RCA Corporation, New York, N.Y.

[21] Appl. No.: 116,624

[22] Filed: Jan. 29, 1980

[51] Int. Cl.³ .............................................. H04N 5/04
[52] U.S. Cl. .................................. 358/153; 358/158; 330/257; 307/352
[58] Field of Search ............... 358/158, 148, 153, 154; 330/252, 254, 255, 257; 307/232, 233, 352, 353; 328/133, 134, 139

[56] References Cited

U.S. PATENT DOCUMENTS

| | | | |
|---|---|---|---|
| 3,815,037 | 6/1974 | Wheatley | 330/19 |
| 3,863,080 | 1/1975 | Steckler | 307/352 |
| 3,927,331 | 12/1975 | Nakashima | 307/232 |
| 4,093,963 | 6/1978 | Uchida | 358/158 |
| 4,144,545 | 3/1979 | Fernsler | 358/158 |
| 4,159,482 | 6/1979 | Apeldoorn | 358/158 |
| 4,216,396 | 8/1980 | Balaban | 358/158 |

Primary Examiner—Benedict V. Safourek
Assistant Examiner—Michael A. Masinick
Attorney, Agent, or Firm—P. J. Rasmussen; W. H. Meagher; W. B. Yorks, Jr.

[57] ABSTRACT

A differential amplifier is provided, including first and second emitter coupled transistors responsive to an input signal applied to one of their base electrodes, and a current source transistor having its collector-to-emitter path serially coupled between the coupled emitters of the first and second transistors and a point of reference potential. A current repeater circuit is coupled between the collector electrodes of the first and second transistors which comprises a current mirror for replicating the collector current of the first transistor. The current mirror includes third and fourth transistors having respective collector electrodes coupled to the collector electrodes of the first and second transistors, respectively, the base electrode of the third transistor being coupled to the base electrode of the fourth transistor, and a resistor for coupling the emitter electrode of at least one of the third and fourth transistors to a source of supply voltage. The collector current of the first transistor is substantially replicated by the collector current of the fourth transistor. A fifth transistor has its collector-to-emitter path serially coupled between the base electrodes of the third and fourth transistors and the resistor, and is biased to conduct a given magnitude of current when the third and fourth transistors are nonconductive and to lessen its conduction when the third and fourth transistors are conducting current.

9 Claims, 1 Drawing Figure

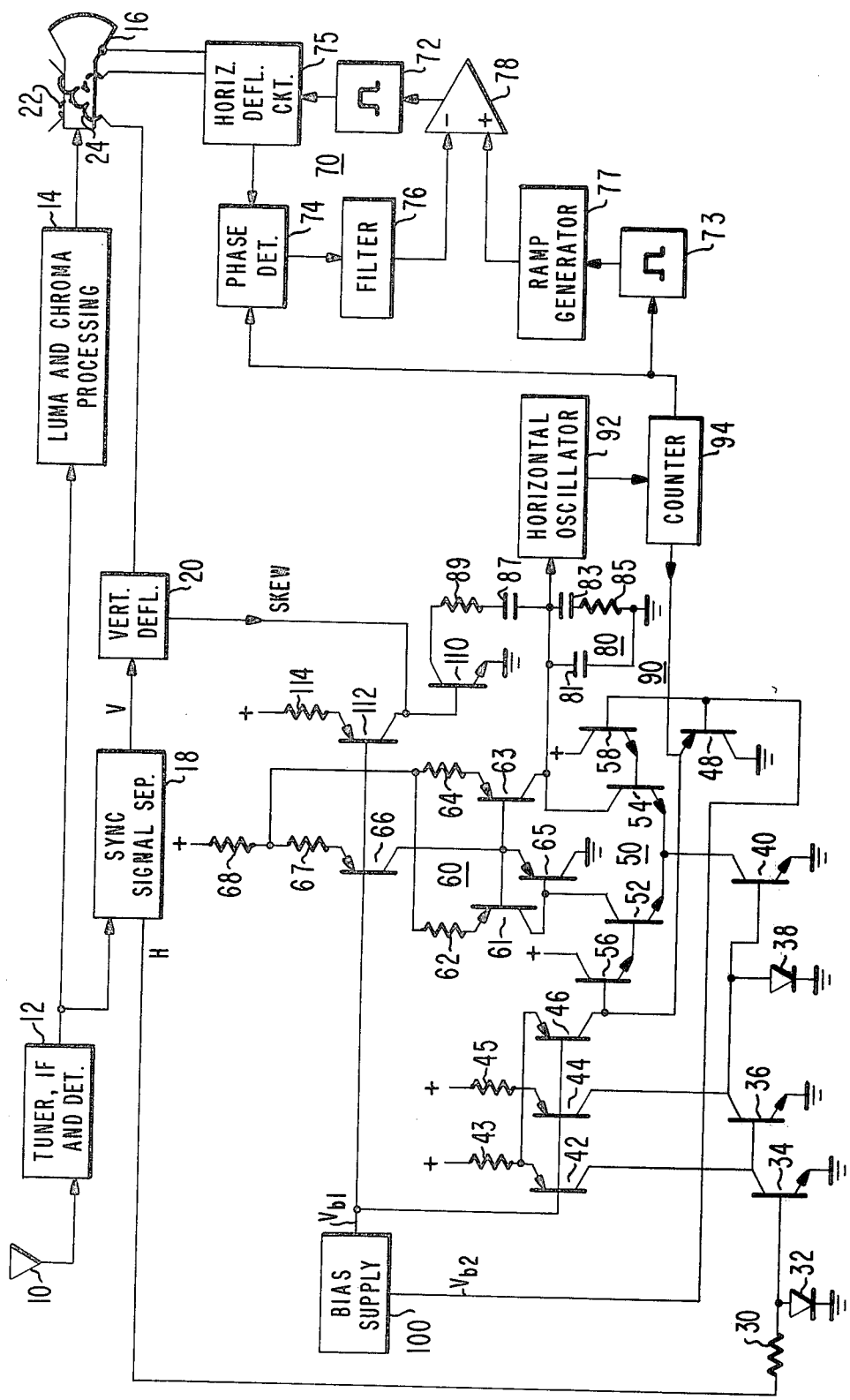

DIFFERENTIAL AMPLIFIER CURRENT REPEATER

This invention relates to current translating or repeating circuits and, in particular, to current repeater circuits useful, for example, as active load devices for a differential amplifier phase detector.

Transistor differential amplifiers may be advantageously arranged to operate as phase detectors for, by way of example, automatic phase control circuits for use in television receiver horizontal deflection systems. In one such typical arrangement, a square wave representative of a sync-locked signal produced by the phase control circuit is compared with horizontal synchronizing signals. The square wave signal is applied to one or both of the bases of two differentially coupled transistors, and the horizontal sync pulses are applied to a current source transistor of the differential amplifier. When the two signals are in phase, the square wave signal will produce a transition from one state to the other in timed relation with the center of a horizontal sync phase. With the two signals in this relationship, one differential amplifier transistor will be conductive for one half of the horizontal sync pulse duration, and the other transistor will be conductive for the other half of the sync pulse duration. When the differential amplifier transistors are connected to balanced loads, the transistors will alternately conduct equal currents. The two currents may be sequentially applied to a filter circuit in an opposite sense relationship to produce a control voltage representative of the phase difference between the sync-locked square wave signal and the horizontal sync pulses. When the square wave transition occurs at a time other than that which is coincident with the center of the sync pulse, one of the differential amplifier transistors will conduct for a longer period than the other. The two currents and the control voltage produced by them will reflect this phase change in the form of the magnitude and sense of the change in the control voltage. The control voltage may be used to control a horizontal oscillator in a loop circuit with the phase detector so as to pull the phase of the sync-locked square wave back into the desired relationship with the horizontal sync pulses.

In the above example, the currents produced by the differential amplifier transistors are of the same polarity and do not readily lend themselves to differential combining in this form. When the phase detector is constructed in integrated circuit form, as is the usual case, it is advantageous to invert one of the currents by use of a current repeater, and then combine it with the other current. Such a current repeater is coupled across the output electrodes of the differential amplifier transistors, as illustrated by current mirror 38 in FIG. 1 of U.S. Pat. No. 4,144,545, issued to Fernsler, et al., and transistors 4 through 7 of FIGS. 1, 2 and 6 of U.S. Pat. No. 3,927,331, issued to Nakashima, et al. While providing satisfactory performance characteristics under most operating conditions, these current repeaters have been found to produce less than ideal current replication due to three factors: imbalance due to base current contribution when the repeater is turned on, offset due to leakage current when the repeater is turned off, and slow turnoff due to stored base charge. As pointed out in the Nakashima patent, the current repeater of FIG. 1 of that patent is unbalanced by base currents flowing in one side of that current repeater. The same is true of the arrangement of Fernsler. The arrangement of FIG. 2 of Nakashima effectively minimizes these base current imbalances, but is still affected by leakage current amplification in the off state. When the current repeater of this arrangement is cut off, leakage currents in the repeater transistors are amplified and appear at the output terminal of the phase detector. Leakage current amplification is prevented in the arrangement of FIG. 6 of Nakashima, in which the leakage current of only one transistor appears at the output of the phase detector.

None of these prior art arrangements overcome the third deficiency mentioned above: that of stored base charge in the current repeater, which can prolong conduction by the current repeater even after the controlling differential amplifier transistor has cut off. This prolonged turnoff by the current repeater can result in an error in the control voltage produced by the phase detector, which will shift the controlled horizontal oscillator away from its nominal operating frequency. This will create an asymmetrical pull-in range in the phase control circuit which, under certain conditions, can result in the horizontal sync signal being beyond the pull-in range of the phase control circuit so that synchronization of the deflection system to the horizontal synchronizing pulses cannot be achieved.

In accordance with the principles of the present invention, a current repeater is provided for a differential amplifier which may be advantageously used as a phase detector in a phase control circuit. The differential amplifier comprises two emitter coupled transistors which receive current from a current source transistor coupled to the joined emitters. First, second and third transistors are coupled in a current mirror arrangement between the collector electrodes of the differential amplifier transistors. The first and second transistors have their collector-to-emitter paths serially coupled between respective collectors of the differential amplifier transistors and a resistor which is coupled to a source of supply voltage. The base electrodes of the first and second transistors are coupled to each other, and to the third transistor. A fourth transistor is coupled between the base electrodes of the first and second transistors and the resistor and is biased by a reference voltage.

When the differential amplifier transistor which is coupled to the first transistor is conducting current, the transistors comprising the current mirror arrangement are conductive, and the second transistor supplies a current which is substantially the same magnitude as, but of an opposite polarity to the current conducted by the first transistor. By virtue of the coupling of the first and second transistors to the resistor and the fourth transistor, the fourth transistor is rendered nonconductive during the time that the first and second transistors are conducting current. When the differential amplifier switches so that the differential amplifier transistor which is coupled to the first transistor is nonconductive, the three current mirror transistors are rendered nonconductive. However, the first and second transistors retain base storage charge, which could operate to prolong conduction by the current mirror even after the differential amplifier transistor which is coupled to the first transistor is cut off. The fourth transistor prevents this prolonged conduction from occurring. As the first and second transistors become nonconductive, their coupling to the fourth transistor renders that transistor conductive. Conduction by the fourth transistor discharges the stored base charge in the first and second transistors, thereby rendering them incapable of prolonged conduction.

The sole drawing illustrates a current repeater constructed in accordance with the present invention as part of a differential amplifier phase detector for an automatic phase control circuit for the deflection system of a television receiver.

In the drawing, video signals are received by antenna 10 and applied to a tuner, intermediate frequency and video detector stage 12. The detected video signals are applied to luminance and chrominance processing circuitry 14, which supplies video drive signals to a kinescope 16. The detected video signals are also applied to a synchronizing signal separating circuit 18, which separates horizontal and vertical sync signals from the video information. Horizontal and vertical sync signals are coupled to a vertical deflection circuit 20, which generates vertical deflection signals for a deflection winding 24 located on the kinescope. The sync separator supplies horizontal sync signals to a horizontal phase control loop circuit 90.

The horizontal sync signals are applied to the base of a common emitter coupled transistor 34 by way of a resistor 30. A diode 32 is coupled in shunt with and in the same polarity as the base-to-emitter junction of the transistor 34. A transistor 42 provides an active load for transistor 34, and has a collector coupled to the collector of transistor 34, an emitter coupled to a source of supply voltage (+) by a resistor 43, and a base coupled to a source of reference voltage $V_{b1}$ which is provided by a bias supply 100. The collector of transistor 34 is coupled to the base of a common emitter coupled transistor 36. A transistor 44 provides an active load for transistor 36 and is coupled in a similar manner as transistor 42. The emitter of transistor 44 is coupled to the + supply by a resistor 45. The collector of transistor 36 is coupled to the base of a current source transistor 40. The emitter of transistor 40 is coupled to a point of reference potential (ground), and its collector is coupled to supply current to a differential amplifier phase detector 50. A diode 38 is coupled in shunt with the base-to-emitter junction of transistor 40, and is poled in the same manner as the junction of the transistor.

The phase detector includes two emitter coupled transistors 52 and 54. A waveform which is to be phase compared with the horizontal sync pulses is applied to the base of transistor 52 from a counter 94 by way of an emitter follower coupled transistor 56. The collector of transistor 56 is coupled to the + supply. A transistor 46 has a collector coupled to the junction of the base of transistor 56 and the output of the counter 94, and serves as an active load for the output of the counter. The emitter of transistor 46 is coupled to the + supply by resistor 43, and its base is coupled to receive reference voltage $V_{b1}$ from the bias supply 100. The base of transistor 54 is coupled to receive a reference voltage $V_{b2}$ from bias supply 100, which is decreased by its coupling through the base-to-emitter junction of a transistor 58. The collector of transistor 58 is coupled to the + supply. A transistor 48 has a base coupled to the source of reference voltage $V_{b2}$, a collector coupled to ground, and an emitter coupled to the base of transistor 56. Transistor 48 prevents the voltage at the base of transistor 56 from rising more than one base-to-emitter voltage increment above the level of reference voltage $V_{b2}$, which would otherwise cause transistor 46 to saturate.

A current repeater 60 is coupled between the collectors of transistors 52 and 54. The current repeater 60 includes transistors 61, 63, and 65, which are coupled in a current mirror configuration. Transistor 61 has a collector coupled to the collector of transistor 52 and to the base of transistor 65. Transistor 63 has a collector coupled to the collector of transistor 54 and to a filter circuit 80. The bases of transistors 61 and 63 are coupled to each other and to the emitter of transistor 65. The collector of transistor 65 is coupled to ground. The emitters of transistors 61 and 63 are coupled together by resistors 62 and 64. The junction of resistors 62 and 64 is coupled to the junction of voltage divider resistors 67 and 68, which are serially coupled between the emitter of a transistor 66 and the + supply. The base of transistor 66 is coupled to the bias supply 100 to receive reference voltage $V_{b1}$, and its collector is coupled to the joined bases of transistors 61 and 63.

The filter circuit 80 includes a capacitor 81, which is coupled between the joined collectors of transistors 63 and 54 and ground. The serial combination of a capacitor 83 and a resistor 85 is coupled in parallel with the capacitor 81. A second serial combination of a capacitor 87 and a resistor 89 is coupled between the ungrounded plate of capacitor 81 and the collector of a transistor 110. The emitter of transistor 110 is coupled to ground, and its base is coupled to receive a skew control pulse from the vertical deflection circuit 20. A transistor 112 acts as an active load for the base of transistor 110 and the skew control pulse output of the vertical deflection circuit, and has a collector coupled to the base of transistor 110, an emitter coupled to the + supply by a resistor 114, and a base coupled to receive reference voltage $V_{b1}$ from the bias supply 100.

A phase control voltage is developed by the filter circuit 80 and is applied to a horizontal oscillator 92 to control its phase and frequency. An output of the horizontal oscillator 92 is coupled to counter 94, which divides down the horizontal oscillator signal to produce an input signal for the phase detector 50, and a horizontal sync locked output signal for a second horizontal phase control circuit 70.

The horizontal sync locked output signal developed by the first horizontal phase control loop circuit 90 is applied to a phase detector 74 and a pulse shaper 73. The pulse shaper 73 develops pulses suitable for the generation of a horizontal sync locked sawtooth waveform by ramp generator 77. The sawtooth waveform is applied to one input of a comparator 78. The phase detector 74 compares the horizontal sync locked output signal to flyback pulses produced by a horizontal deflection circuit 75, and develops an output voltage which is filtered by a filter 76 and applied to a second input of comparator 78. The comparator 78 produces an output signal which determines the time at which a pulse shaper 72 is to produce a horizontal drive pulse for the horizontal deflection circuit 75. In response to the horizontal drive pulses, the horizontal deflection circuit 75 produces deflection signals which are applied to a deflection winding 22 on the kinescope 16. The horizontal deflection circuit 75 also provides an ultor voltage for the kinescope 16.

The horizontal sync pulses which are separated from the video signal by sync signal separator 18 are amplified and inverted twice by transistors 34 and 36 and applied to current source transistor 40. The current source transistor 40 becomes conductive during each horizontal sync pulse to activate the phase detector 50 for the duration of each sync pulse.

The counter 94 produces a square wave of a periodicity substantially equal to that of the horizontal sync pulses. When the phase control loop is locked to the sync signal, the counter square wave will exhibit a transition of a given polarity (i.e., positive-going or negative-going) substantially in synchronism with the center of each horizontal sync pulse. The counter square wave will switch between a two base-to-emitter voltage level (2 $V_{be}$) and a 4 $V_{be}$ level at the base of transistor 56. The base of transistor 58 is maintained at a 3 $V_{be}$ level by reference voltage $V_{b2}$. Thus, the voltage at the base of transistor 54 will be maintained at a 2 $V_{be}$ level, and the signal at the base of transistor 52 will switch between 1 $V_{be}$ and 3 $V_{be}$. When the phase detector is enabled by conduction by transistor 40 and the signal at the base of transistor 52 is at the 3 $V_{be}$ level, transistor 52 will be turned on and transistor 54 will be turned off; when the signal is at the 1 $V_{be}$ level, transistor 52 will be turned off and transistor 54 will be turned on. When the counter square wave transition occurs in timed synchronism with the center of the horizontal sync pulse, each of transistors 52 and 54 will be conductive for half of the sync pulse duration. This is the synchronized condition of the phase control loop 90.

When transistor 52 is rendered conductive, its collector current renders current mirror transistors 61, 63 and 65 conductive and the collector current of transistor 52 is replicated by the collector current of transistor 63 and applied to filter circuit 80 as a charging current. The replicated collector current of transistor 63 is less than the collector current of transistor 52 by an amount equal to the base current of transistor 65, since the collector current of transistor 52 is divided by the collector current of transistor 61 and the base current of transistor 65. The base current of transistor 65 is equal to the sum of the base currents of transistors 61 and 63 divided by the beta ($\beta$) of transistor 65. The base current of transistor 65 is accordingly insignificant by comparison to the collector current of transistor 52 and the replicated collector current of transistor 63 is virtually equal to the collector current of transistor 52.

When transistors 61 and 63 are conducting current, their emitter currents are conducted by resistors 62, 64 and 68. The current flow through resistor 68 causes a voltage drop across that resistor, and the low voltage level at the junction of resistors 67 and 68 is applied to the emitter of transistor 66 by resistor 67. This low voltage level renders transistor 66 nonconductive, and no current is provided to the bases of transistors 61 and 63 and the emitter of transistor 65 from the collector of transistor 66. Since transistor 66 is not conducting when the current mirror transistors 61, 63 and 65 are conducting, these transistors will accurately replicate the collector current of transistor 52 as described above. If transistor 66 were permitted to conduct at this time, the collector current of transistor 63 would decrease, deleteriously affecting the accuracy of the current repeater 60.

When the differential amplifier switches so that transistor 52 is turned off and transistor 54 is turned on, it is desirable to render the current repeater 60 instantaneously nonconductive, so that no current is provided by transistor 63 to subtract from the discharging current which is now supplied to the filter circuit 80 by transistor 54. Any current flow by transistor 63 at this time will cause the phase control loop 90 to have an asymmetrical pull-in range, which can lead to the failure to synchronize that was discussed previously. In accordance with the principles of the present invention, transistor 66 operates to prevent unwanted, prolonged conduction by transistor 63 after the differential amplifier has switched. When transistor 52 turns off, current for the mirror transistors 61, 63 and 65 is removed, and these transistors begin to turn off. As they turn off, the emitter currents of transistors 61 and 63 decrease, and stored charge remains in their base regions, which opposes the turnoff. The decreasing emitter currents of transistors 61 and 63 causes reduction of the current flowing through resistor 68, and the voltage at the junction of resistors 67 and 68 begins to rise. This rising voltage is applied to the emitter of transistor 66 by resistor 67, causing transistor 66 to become conductive. Transistor 66 now provides a path through which the stored base charge of transistors 61 and 63 can flow and be removed, and the stored base charge is quickly swept out. Moreover, conduction by transistor 66 increases the voltage at the base of transistor 63 so that this transistor is maintained solidly nonconductive. This prevents leakage current flow by transistor 63, which would otherwise produce an undesired offset in the currents provided to the filter circuit 80.

Although transistor 66 is described as being turned on and off in an opposite relationship to conduction by transistors 61 and 63, it should be understood that the arrangement of the drawing will still provide a measure of the improvements described above as long as conduction by transistor 66 is controlled in an opposite sense to conduction by transistors 61 and 63. For instance, transistor 66 can be biased so as to be highly conductive when transistors 61 and 63 are turned off, and only slightly conductive when transistors 61 and 63 are conducting current. When the current repeater 60 is biased in this manner, there may be a small error in the replicated current which, in a given embodiment, may be negligible. Moreover, whereas both resistors 62 and 64 are connected to the junction of resistors 67 and 68 in the embodiment of the drawing, the connection of either resistor alone to the junction may be sufficient to control the conduction of transistor 66. The use of both resistors, as shown in the drawing, provides greater control over the switching speed of transistor 66.

It will often be desired to supply the television display device with composite video from a video playback device or tape recorder. Such video tape recorders commonly use a plurality of reproduction heads, each of which is mechanically scanned across the tape. In one common scheme, two heads are used, which alternately scan the tape for a duration equal to that of a vertical field. In order to avoid loss of, or breaks in, the displayed information, the succeeding field scanning is commenced by the second head substantially concurrently with the end of scanning in the first head. However, slight differences in tape tension or in the dimensions of the mechanical tape transport acting on the tape during playback compared with the tension and dimensions when the tape was recorded results in differences in the time between succeeding horizontal sync pulses in the information played back as compared with that recorded, especially during the interval in which switchover between the scanning heads occurs. This results in a discontinuity or step in the phase of the horizontal sync pulses available for synchronizing the horizontal oscillator in phase control loop 90. The step in phase normally occurs about five horizontal lines before the end of a vertical scanning interval.

Such a step change of phase will cause the phase control loop 90 to control the horizontal oscillator 92 in such a manner as to cause the oscillator phase to change and accommodate itself to the altered phase of the synchronizing signals. However, the gain characteristics of the filter circuit 80 loop normally prevents the controlled oscillator from changing at a rate great enough to provide total synchronization between the controlled oscillator and the horizontal sync signals before the end of the vertical blanking interval. This may result in a distortion of the displayed video.

The filter circuit 80 provides two time constants for the phase control loop 90 by virtue of the coupling of capacitor 87 and resistor 89 to skew-controlled transistor 110. During most of each vertical field, transistor 110 is turned on, and resistor 89 and capacitor 87 are a part of the filter circuit 80. In this form, the filter circuit has a slow, relatively noise immune time constant which controls the rate of phase change of the horizontal oscillator 92. Toward the end of each field, a skew control pulse is produced by vertical deflection circuit 20, which causes transistor 110 to be rendered nonconductive for the duration of the vertical blanking interval. At this time, resistor 89 and capacitor 87 are effectively removed from the filter circuit 80, which now has a fast time constant that rapidly allows the horizontal oscillator to skew to the new phase of horizontal sync pulses which are provided by a tape recorder. This skew control arrangement has been constructed and tested with a skew control pulse which turns off transistor 110 during the 256th line of one field and turns it on again during line 12 of the succeeding field (NTSC system).

What is claimed is:

1. In a differential amplifier including first and second emitter coupled transistors responsive to an input signal applied to one of the base electrodes of said first and second transistors, and a current source transistor having its collector-to-emitter path serially coupled between said coupled emitters of said first and second transistors and a point of reference potential; a current repeater circuit coupled between the collector electrodes of said first and second transistors which comprises:

a current mirror for replicating the collector current of said first transistor, including third and fourth transistors having respective collector electrodes coupled to the collector electrodes of said first and second transistors, respectively, the base electrode of said third transistor being coupled to the base electrode of said fourth transistor, and a resistor for coupling the emitter electrode of at least one of said third and fourth transistors to a source of supply voltage, wherein the collector current of said first transistor is substantially replicated by the collector current of said fourth transistor; and a fifth transistor having its collector-to-emitter path serially coupled between said base electrodes of said third and fourth transistors and said resistor, wherein said fifth transistor is biased to conduct a given magnitude of current when said third and fourth transistors are nonconductive and to lessen its conduction when said third and fourth transistors are conducting current.

2. The arrangement of claim 1, wherein said resistor couples the emitter electrodes of said third and said fourth transistors to said source of supply voltage, and wherein said fifth transistor is biased to be nonconductive when said third and fourth transistors are conducting current, and is biased to be conductive when said third and fourth transistors are nonconductive.

3. A differential amplifier phase detector for developing a control signal representative of the phase difference between first and second input signals comprising:

a differential amplifier including first and second emitter coupled transistors, the base electrode of one of said transistors being coupled to receive said first input signal;

a current source transistor having a collector-to-emitter path serially coupled between said emitters of said first and second transistors and a point of reference potential, and a base electrode coupled to receive said second input signal;

a current mirror, including third and fourth transistors having collector electrodes coupled to the collector electrodes of said first and second transistors, respectively, the base electrode of said third transistor being coupled to the base electrode of said fourth transistor, and a resistor for coupling the emitter electrodes of said third and fourth transistors to a source of supply voltage;

a fifth transistor having its collector-to-emitter path serially coupled between said coupled electrodes of said third and fourth transistors and said resistor, and biased to be conductive when said third and fourth transistors are nonconductive; and an output circuit coupled to the junction of the collector of said fourth transistor and the collector of said second transistor.

4. The arrangement of claims 1, 2, or 3, further comprising a sixth transistor having a base electrode coupled to the collector of said third transistor, an emitter electrode coupled to the base electrodes of said third and fourth transistors, and a collector electrode coupled to a point of reference potential.

5. The arrangement of claim 4, further comprising a second resistor coupled between said first named resistor and the emitter electrode of said fifth transistor, a third resistor coupled between the emitter electrode of said third transistor and said first named resistor, and a fourth resistor coupled between the emitter electrode of said fourth transistor and the junction of said third resistor and said first named resistor.

6. The arrangement of claim 5, wherein a reference voltage level is applied to the base electrode of that one of said first and second transistors which is not coupled to receive said input signal.

7. The arrangement of claim 3, wherein said output circuit includes a capacitor coupled between the junction of the collectors of said second and fourth transistors and a point of reference potential.

8. The arrangement of claim 7, further including:

a source of television signals;

means for separating horizontal and vertical sync signals from said television signals;

means for applying said separated horizontal sync signals to the base electrode of said current source transistor;

a vertical deflection circuit responsive to said sync signals for developing vertical deflection signals;

a horizontal deflection circuit, having an input, for developing horizontal deflection signals;

a horizontal oscillator having an input coupled to said output circuit and an output;

a counter having an input coupled to the output of said horizontal oscillator, a first output coupled to the base electrode of said first transistor, and a second output coupled to said input of said horizontal deflection circuit.

9. The arrangement of claim 8, wherein said output circuit further includes a second capacitor and a seventh transistor, the collector-to-emitter path of said seventh transistor and said second capacitor being serially coupled in parallel with said first named capacitor, and the base electrode of said seventh transistor being coupled to said vertical deflection circuit and responsive to a signal therefrom which renders said seventh transistor nonconductive during the vertical retrace interval of said television signals.

* * * * *